United States Patent
Hasaka et al.

(10) Patent No.: US 6,689,005 B2
(45) Date of Patent: Feb. 10, 2004

(54) POWER TRANSMISSION BELT WITH FABRIC MATERIAL ON A SURFACE THEREOF

(75) Inventors: Hitoshi Hasaka, Hyogo (JP); Keiji Takano, Hyogo (JP); Sumiko Takeuchi, Osaka (JP)

(73) Assignee: Mitsuboshi Belting Ltd. (JP)

( * ) Notice: Subject to any disclaimer, the term of this patent is extended or adjusted under 35 U.S.C. 154(b) by 198 days.

(21) Appl. No.: 09/888,203

(22) Filed: Jun. 22, 2001

(65) Prior Publication Data

US 2002/0039947 A1 Apr. 4, 2002

(30) Foreign Application Priority Data

Jun. 22, 2000 (JP) .................................... 2000-188330
Apr. 27, 2001 (JP) .................................... 2001-132369
Jun. 15, 2001 (JP) .................................... 2001-181279

(51) Int. Cl.⁷ ................................................ F16G 5/00
(52) U.S. Cl. ...................................... 474/267; 474/268
(58) Field of Search ................... 474/263, 261, 474/265, 266, 267, 268, 271

(56) References Cited

U.S. PATENT DOCUMENTS 4,514,179 A    4/1985  Skura ........................ 474/204
5,224,905 A    7/1993  Mishima ..................... 474/258
5,310,386 A  * 5/1994  Mizuno et al. ............. 474/205
5,683,819 A  * 11/1997 Mori et al. .................. 428/500
5,711,734 A  * 1/1998  Shioyama et al. .......... 474/260
5,861,212 A  * 1/1999  Mori et al. .................. 428/375

FOREIGN PATENT DOCUMENTS

EP         0665390 A1    8/1995
JP         07-217705     8/1995
WO         WO99/62996    12/1999

* cited by examiner

Primary Examiner—Thomas R. Hannon
Assistant Examiner—Vicky A. Johnson
(74) Attorney, Agent, or Firm—Wood, Phillips, Katz, Clark & Mortimer

(57) ABSTRACT

A power transmission belt having a body with a length, an inside, an outside, and laterally oppositely facing side surfaces. The body has a) a cushion rubber layer in which at least one load carrying element is embedded so that the at least one load carrying element extends lengthwise relative to the body, and b) a compression rubber layer. Fabric material is provided on one of the inside and outside of the body. The fabric material is treated with a mixture of carbon-black-dispersed liquid and resorcinol-formalin-latex liquid.

38 Claims, 1 Drawing Sheet

POWER TRANSMISSION BELT WITH FABRIC MATERIAL ON A SURFACE THEREOF

FIELD OF THE INVENTION

This invention relates to power transmission belts and, more particularly, to a power transmission belt having a body with an inside and an outside and a fabric material applied to at least one of the inside and outside of the body.

BACKGROUND ART

It is known to apply fabric material, such as canvas, to a surface of a V-ribbed power transmission belt. As one example, Japanese Laid-Open Patent Publication No. 4-151048 discloses a V-ribbed belt with a body having a compression rubber layer in which a plurality of longitudinally extending ribs are formed. The body further has a cushion rubber layer, within which load carrying cords are embedded, and applied to the compression rubber layer. A machine joined canvas layer is adhered to the back of the cushion rubber layer. The canvas layer is intended to avoid the development of cracks in the lengthwise direction of the body, and is formed by impregnating a plain-woven cloth, consisting of crossing warp and weft yarns, with rubber.

A typical woven cloth used in the above type of belt is commonly formed by mechanical treatment, namely tenter treatment, in which the intersection angle of warp and weft yarns, which initially is at 90° in the plain-woven cloth, is changed to 1200. The canvas yarns are spun yarns made of 100% cotton, each with a tensile strength of at least 9N. The yarns are present in an amount of 14 per 10 mm or more in the belt.

The canvas is then dipped in resorcinol-formalin-latex liquid (RFL liquid) and is thereafter impregnated with unvulcanized rubber or immersed in a soaking liquid, in which rubber is dissolved, to improved the adherence of the canvas to the rubber layer to which it is applied.

Generally, friction treating of the canvas to impregnate the canvas with unvulcanized rubber, after the canvas has been dipped in resorcinol-formalin-latex liquid, is relatively time consuming. Further, if the canvas treated in the above manner is applied to the back of a belt to improve the belt's power transmission capability, rubber dregs may appear thereon. The dregs tend to accumulate on the back surface of the belt, or wherever the fabric material is applied. This may result in noise generation. Another problem is that the rubber dregs may separate and scatter to other products, to equipment used to form the belts, and to other areas in the vicinity of the equipment.

The process in which the fabric material is dipped in a soaking liquid also may take a considerable amount of time to carry out. Even though the rubber content may be less using this process, rubber dregs may still appear on the fabric material.

SUMMARY OF THE INVENTION

In one form, the invention is directed to a power transmission belt having a body with a length, an inside, an outside, and laterally oppositely facing side surfaces. The body has a) a cushion rubber layer in which at least one load carrying element is embedded so that the at least one load carrying element extends lengthwise relative to the body and b) a compression rubber layer. Fabric material is provided on one of the inside and outside of the body. The fabric material is treated with a mixture of carbon-black-dispersed liquid and resorcinol-formalin-latex liquid.

In one form, a solid component weight ratio of carbon black to the resorcinol-formalin-latex in the mixture is 1:9 to 7:3.

The mixture may further include a cross-linking agent capable of being dispersed in water.

The cross-linking agent may include a colloidal sulfur. The colloidal sulfur may be present in the mixture in a range of 0.2 to 10 parts by mass per 100 parts of a latex component.

The cross-linking agent may include an organic peroxide. The organic peroxide may be present in the mixture in a range of 0.2 to 15 parts by mass per parts of a latex component.

In one form, the cross-linking agent includes a metal oxide and a latex component in the resorcinol-formalin-latex liquid has functional groups.

In one form, the cross-linking agent includes a zinc oxide and a latex component in the resorcinol-formalin-latex liquid is vinylpyridine latex.

In one form, the cross-linking agent includes a metal oxide. The metal oxide may be present in the mixture in a range of 0.5 to 15 parts by mass per 100 parts of a latex component.

In one form, the carbon black in the carbon-black-dispersed liquid is at least one of HAF, MAF, EPC, and ISAF.

The mixture may further include a vulcanization accelerator. The vulcanization accelerator may be present in an amount of 0.5 to 10 parts by mass per 100 parts by mass of a latex component.

In one form, solid components in the mixture are present in a range of 5–40%.

The compression rubber layer may have at least one rib extending lengthwise of the body. In one form, the at least one rib is on the inside of the body and the fabric material is on at least the outside of the body.

In one form, the fabric material is made from at least one of a) natural fiber, b) inorganic fiber, and c) organic fiber formed by one of i) plain weaving, ii) twill weaving, and iii) sateen weaving.

The body may further include short fibers which have lengths extending generally in a lateral direction.

The power transmission belt may be a V belt with the fabric material on the inside and/or the outside of the body.

The power transmission belt may be a flat belt.

In one form, the compression rubber layer is defined by at least one of a) hydrogenated nitrile rubber, b) chloroprene rubber, c) natural rubber, d) CSM, e) ACSM, f) SBR, and g) ethylene-α-olefin elastomer.

In one form, the at least one load carrying element is a load carrying cord defined by at least one of a) polyester fiber, b) aramid fiber, and c) glass fiber.

The invention is further directed to a power transmission belt having a body with a length, an inside, an outside, and laterally oppositely facing side surfaces. A fabric material is provided on at least one of the inside and outside of the body. The fabric material is treated with a mixture of carbon-black-dispersed liquid and resorcinol-formalin-latex liquid.

The body may further include at least one load carrying element extending lengthwise relative to the body.

The load carrying element may be a load carrying cord.

The power transmission belt may be any of a V-ribbed belt, a V belt, or a flat belt.

DETAILED DESCRIPTION OF THE DRAWINGS

Figure 1:
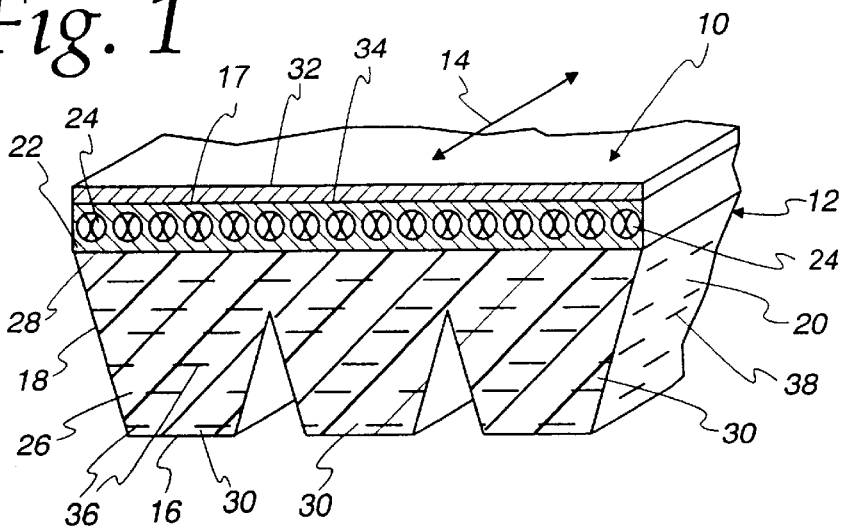
FIG. 1 is a fragmentary, cross-sectional view of a V-ribbed belt, made according to the present invention.

In FIG. 1, one form of power transmission belt, suitable for incorporation into the present invention, is shown at 10. The power transmission belt 10 is commonly referred to as a V-ribbed belt. The belt 10 has a body 12 with a length, in the direction of the double-headed arrow 14, an inside surface 16, an outside surface 17, and spaced, laterally oppositely facing, side surfaces 18, 20.

The body 12 has a cushion rubber layer 22 in which load carrying cords 24 are embedded. The load carrying cords 24 are spirally wrapped and extend generally lengthwise relative to the belt body 12. The load carrying cords 24 are made from material such as polyester fiber, aramid fiber, and glass fiber, all of which exhibit good strength and low extensibility.

A compression rubber layer 26 is applied to the inside surface 28 of the cushion rubber layer 22. Three laterally spaced, longitudinally extending, V-shaped ribs 30 are formed in the compression rubber layer 26.

According to the invention, a layer of fabric material 32 is applied to the outside of the body 12. In this embodiment, the outside surface 34 of the cushion rubber layer 22 defines the outside of the body 12.

The fabric material consists of threads that may be one, or a mixture of: a) a natural fiber such as cotton or hemp; b) inorganic fiber such as metal or glass; c) organic fiber such as polyamide, polyester, polyethylene, polyurethane, polystyrene, polyfluoroethylene, polyacryl, polyvinyl alcohol, full-aromatic polyester, full-aromatic polyamide; and d) other like materials. Using these fibers, the fabric material 32 is formed by one of plain weaving, twill weaving, and sateen weaving. The resulting layer of fabric material 32 is dipped in a liquid mixture of carbon-black-dispersed liquid and a resorcinol-formalin-latex (RFL) liquid for 0.1 to 20 seconds and heated at a temperature of 100°–200° C. for 30–600 seconds to an extent that it is colored black.

In the above liquid mixture, it is preferred that a solid component weight ratio of carbon black to the resorcinol-formalin-latex be 1:9 to 7:3. If the amount of the carbon black is less than within this range, the coloration of the treated fabric material may not homogeneous. This may detract from the overall appearance of the belt. On the other hand, if the amount of carbon black is greater than the range stated, the adhesion between the layer of treated fabric material 32 and the belt body 12 may be undesirably diminished. It is also desirable that a mixing amount of the solid components be controlled so that the concentration of all solid components in the liquid mixture be in the range of 5 to 40%.

The carbon-black-dispersed liquid is a suspension formed by dispersing carbon black and a surfactant in water. The carbon black may be one, or a combination, of HAF, MAF, EPC, and ISAF. The RFL liquid is a liquid mixture prepared by mixing an initial condensate of resorcinol and formalin with latex. The molar ratio of resorcinol to formalin is preferably in a range of 1:0.5 to 1:3 to obtain a desired adhesive strength. The initial condensate of resorcinol and formalin is mixed with the latex in such a manner that 10 to 100 parts by weight of the resin are present per 100 parts by weight of the rubber component of the latex and so that the total solid component content is 5–40%. Known surfactants may be added to the RFL liquid in an amount of 0.1 to 5.0%.

The latex may be ternary copolymer of styrene-butadiene-vinylpyridine, chlorosulfonated polyethylene, nitryl rubber, hydrogenated nitryl rubber, epichlorohydrin, natural rubber, SBR, chloroprene rubber, olefin-vinylester copolymer, EPDM, or the like.

A cross-linking agent, capable of being dispersed in water, may be added into the mixture. By doing so, the latex component impregnated into the fabric material during vulcanization shows a cross-linking effect. This may prevent oozing of rubber from the openings in the fabric of the sheet material. This may result in a reduction in the appearance of the adhesive substance, as in the form of dregs, even after the belt has been run for an extended period of time.

A suitable cross-linking agent is colloidal sulfur. Colloidal sulfur is obtained by drying sol, which is produced by putting precipitated sulfur or powder sulfur and a dispersing agent into a ball mill or a colloidal mill.

It is also possible to mix an organic peroxide in the liquid mixture. Examples of suitable organic peroxides are di-t-butyl-peroxide, dicumyl-peroxide, t-butylcumyl-peroxide, 1,1-t-butylperoxy-3,3,5-trimethyl cyclohexane, 2,5-di-methyl-25-di(t-butylperohexy)hexane, 2,5-di-methyl-2,5-di(t-butylperohexy)hexyne, bis(t-butylperoxy-di-isopropyl) benzene, 2,5-di-methyl-2,5-di(benzoyl-peroxy)hexane, t-butylperoxy benzoate, and t-butylperoxy-2-ethyl-hexylcarbonate. These organic peroxides may be used either alone or in combination.

Further, a metal oxide may be used as a cross-linking agent. Suitable metal oxides are zinc oxide, magnesium oxide, and calcium oxide. Of these, zinc oxide is preferred. These metal oxides may be used either alone or in combination.

The cross-linking agent is preferably selected with consideration given to the latex component that is contained in the liquid mixture. If the latex contains functional groups such as a carboxyl group or a chlorosulfonyl group, metal oxides are effective. The colloidal sulfur and the organic peroxide are also preferably selected with consideration given to the latex component that is contained in the liquid mixture. These cross-linking agents likewise may be used either alone or in combination.

The cross-linking agents are preferably present in the mixture in an amount of 0.2 to 10 parts by mass for colloidal sulfur, 0.2 to 15 parts by mass for organic peroxide, and 0.5 to 15 parts by mass for metal oxide, per 100 parts of a latex component. If these amounts are lower than this range, it may be difficult to prevent rubber oozing through the openings in the fabric of the material 32. As a result, adhesive migrating therethrough may be exposed to be abraded during running. On the other hand, if these amounts are above this range, the fabric material 32 may be too stiff, as a result of which the adhesion between the fabric material 32 and body 12 may be undesirably compromised.

Further, if a cross-linking agent and a latex are selected by giving consideration to the rubber composition of the body, adhesion between the body 12 and fabric material 32 may be increased.

The mixture may further include a vulcanization accelerator. As examples, tetramethyl thiuram disulfide (TMTD) and dibenzothiazyl-disulfide may be used. It is preferred that the vulcanization accelerator be present in an amount of 0.5 to 15 parts by mass per 100 parts by mass of the rubber latex. If the amount is less than 0.5 parts by mass, a sufficient vulcanization accelerator effect may not be realized. On the other hand, if the amount is greater than 15 parts by mass, the vulcanization introduction time for the latex component impregnated in the fabric material 32 may be undesirably shortened. As a result, the canvas may become undesirably hardened prior to the vulcanization of the body 12, which may compromise the adhesive connection between the fabric material 32 and the body 12.

The compression rubber layer 26 may be made from hydrogenated nitrile rubber, chloroprene rubber, natural rubber, CSM, ASCM, SBR, or ethylene-α-olefin elastomer. The hydrogenated nitrile rubber preferably has a hydrogenation rate of at least 80%. To further improve resistance to heat and ozone, preferably the hydrogenated nitrile rubber has a hydrogenation rate of 90% or more. If the hydrogenation rate is less than 80%, resistance to both heat and ozone may become undesirably low. Generally, to provide desired resistance to oil and good operating characteristics in low temperature environments, the acrylonitrile amount is preferably within the range of 20–45%.

A suitable ethylene-α-olefin elastomer is EPDM (ethylene-propylene-diene-monomer. Examples of suitable diene-monomers are dicyclopentadiene, methylenenorbornane, ethylidenenorbornane, 1,4-hexadiene, and cyclooctadiene.

For the rubber to be cross-linked, sulfur or organic peroxides may be used. Examples of organic peroxides are di-t-butyl-peroxide, dicumyl-peroxide, t-butylcumyl-peroxide, 1,1-t-butylperoxy-3,3,5-trimethyl cyclohexane, 2,5-di-methyl-2,5-di(t-butylperohexy)hexane, 2,5-di-methyl-2,5-di(t-butylperohexy)hexyne, bis(t-butylperoxy-di-isoproyl)benzene, 2,5-di-methyl-2,5-di(benzoyl-peroxy)hexane, t-butylperoxy benzoate, and t-butylperoxy-2-ethyl-hexylcarbonate. These organic peroxides may be used either alone or in combination and are commonly added in an amount of 0.005 to 0.02 mol per 100 g of ethylene-α-olefin elastomer.

A Vulcanization accelerators may also be added. These vulcanization promoting agents are classified as thiazole series, thiuram series, and sulfenicamide series. Suitable thiazole series vulcanization accelerators are 2-mercapto-benzothiazole, 2-mercapto-thiazolin, dibenzothiazyl-disulfide, and zinc salt of 2-mercapto benzothiazole. Suitable thiuram series vulcanization accelerators are tetramethyl-thiuram-monosulfide, tetramethyl-chiuram-disulfide, tetraethyl-thiuram-disulfide, and N,N'-dimethyl-N,N'-diphenyl-thiuram-disulfide. Suitable sulfenicamide series vulcanization accelerators are N-cyclohexyl-2-benzothiazyl sulfenicamide and N,N'-cyclohexyl-2-benzothiazyl-sulfenicamide. Other suitable vulcanization accelerators are bismaleimide and ethylene thiourea. The above vulcanization accelerators may be used alone or in a combination of two or more.

The use of cross-linking auxiliary agents may improve the extent of cross-linking to avoid adhesive abrasion. Examples of suitable cross-linking auxiliary agents are TIAC, TAC, 1,2-polybutadiene, metal salt of unsaturated carbonic acid, oxime, guanidine, trimethylol-propane-trimetacrylate, ethyleneglycol-dimetacrylate, N,N'-m-phenylene-bismaleimide and sulfur, all of which are used in peroxide vulcanization.

Other additives can be used, such as reinforcing agents like carbon black and silica, fillers like calcium carbonate and talc, plasticizers, stabilizers, processing auxiliary agents, and coloring agents.

To increase lateral pressure resistance in the compression rubber layer 26 short, reinforcing fibers 36 may be embedded therein so that the length of the fibers 36 project generally in a lateral direction relative to the belt body 12. The fibers may be made of nylon 6, nylon 66, polyester, cotton, and/or aramid. The fibers 36 may project outwardly from the belt side surfaces 18, 20 so that portions 38 thereof are exposed at the side surfaces 18, 20 so as to contact a cooperating pulley surface. The fibers 36 reduce the coefficient of friction between the compression rubber layer 26 and a cooperating pulley. This can reduce noise generation between the belt 10 and the cooperating pulley during operation of the belt 10. Of the above short fibers, the most desirable are aramid fibers, which have good rigidity and strength, as well as good resistance to abrasion.

Preferably, the short fibers 36 have a length of 1 to 20 mm and are present in an amount of 1 to 30 parts by weight per 100 parts by weight of ethylene-α-olefin. The aramid fibers preferred are those whose molecular structure has aromatic rings. Products suitable for use with the invention are currently sold commercially under the trademarks CORNEX™, NOMEX™, KEVLAR™, TECHNORA™ and TWARON™.

If the amount of short aramid fibers is less than 1 part by weight, the rubber component of the compression rubber layer 26 may become sticky, which may result in a problem of adhesive abrasion. If the amount of fibers 36 exceeds 30 parts by weight, the fibers 36 may not be uniformly dispersed in the rubber of the compression rubber layer 26.

The load carrying cords 24 may be formed from polyester fiber, aramid fiber, or glass fiber. It is preferred to use an adhesion treated cord with a total denier of 4,000 to 8,000, which is made up mainly of ethylene-2,6-naphthalate. The cords are formed by twisting a bundle of polyester fiber filaments. With this construction, the slip rate of the belt may be controlled and the belt may be made with a relatively long life. The cords are twisted with a final twist of 10 to 23 per 10 cm, with a primary twist of 17 to 38 per 10 cm. If the total denier is less than 4,000, the modulus and strength of the load carrying cords 24 may be undesirably low. On the other hand, if the total denier is greater than 8,000, the belt 10 may become overly thick to accommodate the load carrying cords 24, as a result of which the bending fatigue properties of the belt may be undesirably compromised.

Ethylene-2,6-naphthalate can be synthesized by polycondensation of naphthalene-2,6-dicarbonic acid or ester formation derivatives thereof with ethylene glycol in the presence of an appropriate catalyst. One or more appropriate third components may be added, prior to the completion of the polymerization of the ethylene2,6-naphthalate, to produce the polyester copolymers.

The load carrying cords 24 are subjected to adhesion treatment to improve their adhesion with the rubber in the cushion rubber layer 22. This adhesion treatment is carried out by dipping the fiber material in a resorcinol-formalin-latex (RFL) liquid. Thereafter, the cords 24 are heat dried so as to produce a uniform adhesive layer on the surface thereof. It is also possible to use other methods of preformation, including the step of pretreatment using epoxy or isocyanate compounds, followed by the above treatment using the RFL liquid.

The cords thus treated are wound at a spinning pitch of 1.0 to 1.3 mm to produce a belt having a high modulus. If the spinning pitch is less than 1.0 mm, it may be difficult for the cords to be wound, due to their proximity. If the spinning pitch is greater than 1.3 mm, the modulus of the belt may become unacceptably low.

If the rubber in the cushion rubber layer 22 is the same as the rubber in the compression rubber layer 26, the belt 10 generally exhibits good heat resistance. In the embodiment shown, no short fibers 36 are embedded in the cushion rubber layer 22. Additional components may include reinforcing agents, such as carbon black and silica, fillers such as calcium carbonate and talc, plasticizers, stabilizers, processing auxiliary agents, and coloring agents.

One method of forming the belt 10 will now be described. Initially, the fabric material layer 32 and one part of the cushion rubber layer 22 are wound around a cylindrical drum. The load carrying cords 24 are then spirally wrapped therearound, followed by winding of the compression rubber layer 26. The resulting subassembly is then vulcanized to form a power transmission sleeve.

The resulting vulcanized sleeve is trained around drive and driven pulleys and run continuously in a predetermined path at a selected tensile force. A rotating cutting wheel is positioned in contact with the moving sleeve and is repositioned so that a plurality of grooves (3 to 100) are simultaneously cut in the compression rubber layer 26 at the exposed inside surface of the sleeve.

The sleeve is then separated from the pulleys and trained around separate drive and driven pulleys and run in a continuous path. A cutter is then used to sever the sleeve to form individual V-ribbed belts of desired width.

Figure 2:
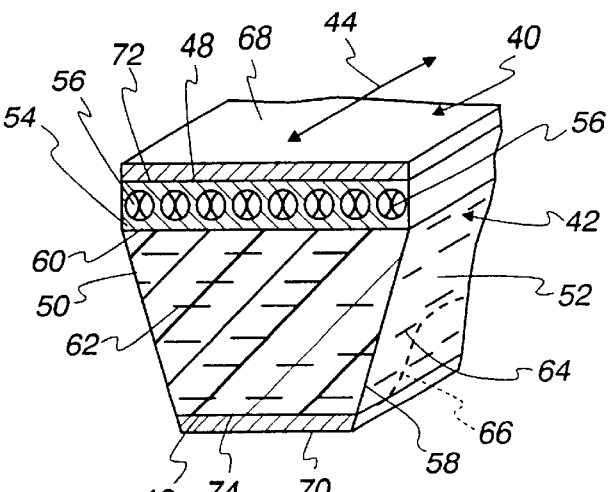
FIG. 2 is a fragmentary, cross-sectional view of a V belt, made according to the present invention.

The invention is not limited to the configuration of the belt 10 shown in FIG. 1. As one other example, a V-belt, made according to the present invention, is shown at 40 in FIG. 2. The belt 40 has a body 42 with a length, as indicated by the double-headed arrow 44. The body 42 has an inside surface 46, an outside surface 48, and laterally oppositely facing pulley engaging side surfaces 50, 52.

The body 42 is defined by a cushion rubber layer 54 with load carrying cords 56 embedded therein. A compression rubber layer 58 is applied to the inside surface 60 of the cushion rubber layer 54. Short, laterally extending, reinforcing fibers 62 are embedded in the compression rubber layer 58 and have projecting portions 64 exposed at the side surfaces 50, 52. Optional cogs 66 may be formed in the compression rubber layer 58 at regular intervals along the length of the belt body 42.

In this embodiment, fabric material layers 68, 70 are applied respectively to the outside surface 72 of the cushion rubber layer 54 and inside surface 74 of the compression rubber layer 58. The belt components are otherwise the same, and assembled in the same manner, as those corresponding components in the belt 10.

Figure 3:
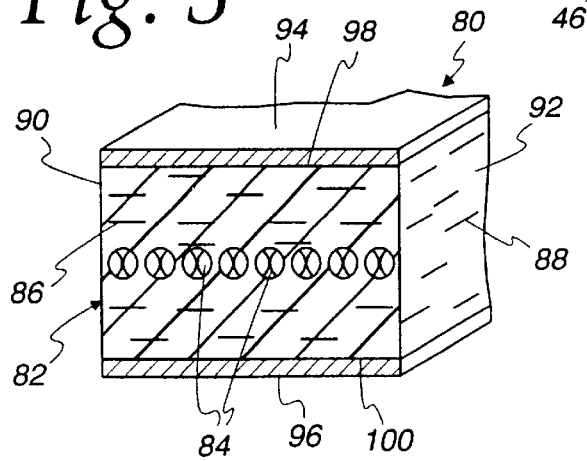
FIG. 3 is a fragmentary, cross-sectional view of a flat belt, made according to the present invention.

In FIG. 3, another form of power transmission belt is shown at 80 into which the present invention is incorporated. The power transmission belt 80 is a flat belt with a body 82 having load carrying cords 84 embedded therein. The body 82 may be formed from one or multiple layers within which load carrying cords are embedded, and which extend to inside and outside of the load carrying cords. Reinforcing fibers 86 may be embedded in the body 82 and have projecting portions 88 at oppositely facing side surfaces 90, 92. Fabric material layers 94, 96 are provided on oppositely facing surfaces 98, 100 on the body 82. The components shown on the belt 80 correspond to those on the belts 10, 40 described previously in greater detail. The fabric material layers 94, 96 have the composition previously described and are attached to the body 82 as also previously described for the fabric material layers on the belts 10, 40.

Figure 4:
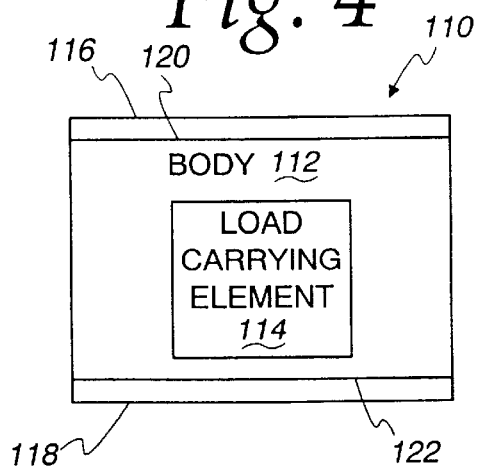
FIG. 4 is a generic, partially schematic, representation of a belt body having a length and a load carrying element incorporated therein for lengthwise stability, made according to the present invention.

In FIG. 4, a power transmission belt is shown generically at 110 having a body 112 with a load carrying element 114 incorporated therein. The load carrying element 114 can take a number of different forms, as opposed to the load carrying cords 24, 56, 84, previously described, and can be incorporated into the belts of the type shown at 10, 40, 80 in FIGS. 1–3, respectively. On the belt 110, fabric material layers 116 118 are incorporated on oppositely facing surfaces 120, 122 of the body 112. Again, the components on the power transmission belt 110 in FIG. 4 correspond to those in the belts 10, 40, 80, previously described.

The fabric material, made according to the present invention, may reduce the appearance of rubber dregs, compared to certain conventional belt fabric materials, to thereby contribute to a reduction in adhesion to cooperating pulleys and noise generation during operation and scattering of separated dregs in the vicinity of where the belts are operated. The effects of the present invention will now be demonstrated with respect to comparative testing.

INVENTIVE EXAMPLES 1–5 AND
COMPARATIVE EXAMPLE 1

In the Inventive Examples, an untreated, plain-woven cotton canvas layer with cotton threads 20 s/2, warp yarns 70 per 5 cm, and weft yarns 70 per 5 cm, was dipped for ten seconds in a liquid mixture as shown in Table 1.

TABLE 1

|  | Inventive Examples | | | | | Comparative Example |
|---|---|---|---|---|---|---|
|  | 1 | 2 | 3 | 4 | 5 | 1 |
| RFL No. | RFL-1 | RFL-2 | RFL-3 | RFL-4 | RFL-5 | RFL-6 |
| Solid component mass ratio (Carbon/RFL) | 1/9 | 3/7 | 5/5 | 7/3 | 5/5 | 9/1 |
| Vinylpyridine latex (40%) | 100.0 | 100.0 | 100.0 | 100.0 | 100.0 | 100.0 |
| Carbon-black-dispersed liquid (28%) | 23.8 | 91.8 | 214.3 | 500.0 | 214.3 | 1928.7 |
| Resorcinol | 14.6 | 14.6 | 14.6 | 14.6 | 14.6 | 14.6 |
| 37% formalin | 9.2 | 9.2 | 9.2 | 9.2 | 9.2 | 9.2 |
| Caustic soda | 1.5 | 1.5 | 1.5 | 1.5 | 1.5 | 1.5 |

TABLE 1-continued

|  | Inventive Examples | | | | | Comparative Example |
|---|---|---|---|---|---|---|
|  | 1 | 2 | 3 | 4 | 5 | 1 |
| Water | 281.8 | 336.9 | 436.0 | 667.3 | 436.0 | 1824.0 |
| Colloidal sulfur *1 | — | — | — | — | 2.0 | — |
| Zinc oxide | — | — | — | — | 6.0 | — |
| TMTD | — | — | — | — | 2.0 | — |
| Total | 430.9 | 554.0 | 775.6 | 1292.6 | 785.6 | 3878.0 |
| Flat peeling-off strength (N/25 mm) | 200 | 195 | 195 | 170 | 210 | 125 |
| Appearance *2 (first time interval) | ▲ | ▲ | ● | ● | ● | ● |
| Overall evaluation | ● | ● | ● | ● | ● | X |

*1 Colloidal sulfur 95 made by Bayer
*2 Evaluation of appearance
●: the coloration was uniform and no color change was observed.
▲: the coloration was uniform but the canvas became light red in color over time.
X: the coloration was not uniform and the canvas become light red in color over time.

The liquid mixture contained a carbon-black-dispersed liquid and RFL liquid. After dipping, the canvas was heat treated for four minutes at a temperature of 150° C. The treated canvas was then applied to a rubber sheet containing components as shown in Table 2, below.

TABLE 2

| Components | Parts by Weight |
|---|---|
| Chloroprene | 100 |
| Carbon (N-550) | 40 |
| Naphtene oil | 5 |
| AC polyethylene 617 | 5 |
| Stearic acid | 1 |
| Magnesium oxide | 4 |
| Anti-aging agent | 2 |
| Zinc oxide | 5 |

The rubber sheet had a thickness of 4 mm. A pressing treatment was performed using a pressing plate with a pressure of 0.2 MPa, followed by a vulcanization treatment at a temperature of 150° C. for twenty minutes. A flat test piece was thereby obtained which was used to carry out a "peeling off" test. The test was carried out under JISK-6256. The results are shown in Table 1, above.

The uniformity of color in the above treated canvas, and the change in color over time (one, two, and three months later) were determined by visual observation.

From these tests, it was determined that Inventive Examples 3–5 had good adhesive strength and coloration. Comparative Example 1 had a relatively low adhesive strength. Although Inventive Examples 1 and 2 had good adhesive strength and uniformity of color, they did show red color and the color thereof changed over time.

INVENTIVE EXAMPLES 6–12 AND COMPARATIVE EXAMPLES 2 AND 3

In Inventive Example 6, an untreated, plain woven, cotton canvas, with cotton threads 20 s/2, warp yarns 70 per 5 cm, and weft yarns 70 per 5 cm, was dipped for ten seconds in RFL-A pre-treating liquid, as shown in Table 3, below.

TABLE 3

|  | RFL No. | | | | | | | |
|---|---|---|---|---|---|---|---|---|
|  | RFL-A | RFL-B | RFL-C | RFL-D | RFL-E | RFL-F | RFL-G | RFL-H |
| Solid component mass ratio (Carbon/RFL) |  |  |  | 5/5 |  |  |  | — |
| Vinylpyridine latex (40%) | 100.0 | 100.0 | 100.0 | 100.0 |  |  |  | 100.0 |
| EPDM latex *3 |  |  |  |  | 100.0 | 100.0 | 100.0 |  |
| Carbon-black-dispersed liquid (28%) | 214.3 | 214.3 | 214.3 | 214.3 | 214.3 | 214.3 | 214.3 | — |
| Resorcinol | 14.6 | 14.6 | 14.6 | 14.6 | 14.6 | 14.6 | 14.6 | 14.6 |
| 37% Formalin | 9.2 | 9.2 | 9.2 | 9.2 | 9.2 | 9.2 | 9.2 | 9.2 |
| Caustic soda | 1.5 | 1.5 | 1.5 | 1.5 | 1.5 | 1.5 | 1.5 | 1.5 |
| Water | 436.0 | 436.0 | 436.0 | 436.0 | 436.0 | 436.0 | 436.0 | 262.5 |
| Colloidal sulfur | — | 2.0 | 2.0 | 2.0 | 2.0 | 2.0 | — | — |
| Zinc oxide | — | — | — | 6.0 | — | — | — | — |
| Organic peroxide *4 | — | — | — | — | — | — | 4.0 | — |
| Dibenzothiazyl-disulfide *5 | — | — | 6.0 | — | — | 6.0 | — | — |
| TMTD | — | — | — | 2.0 | — | — | — | — |
| Total | 775.6 | 777.6 | 783.6 | 785.6 | 777.6 | 783.6 | 779.6 | 387.8 |

*3 Made by SUMITOMO SEIKA CHEMICAL
*4 PX14-40PM made by KAYAKU AKZO
*5 NOCCELER DM-P made by OUCHISHINKO CHEMICAL INDUSTRIAL This treatment was followed by a wide-angle tenter treatment to produce a 120° relationship between the warp and weft yarns, followed by heat treatment for four minutes at a temperature of 150° C.

Inventive Examples 7–12 were prepared using the same adhesive treatment and same tentering treatment, with the exception that each Inventive Example was treated with a liquid mixture as described in Table 3, above.

In Comparative Example 2, the same untreated canvas was dipped for ten seconds in an RFL-H treating liquid as shown in Table 3, followed by heat treatment for four minutes at a temperature of 150° C. The canvas was thereafter wide-angle tenter treated to reorient the warp and weft yarns to an angled relationship of 120°. Friction treatment was carried out to impregnate the various rubber components, as shown in Table 4, below.

TABLE 4

| Components | Parts by Weight |
|---|---|
| Chloroprene | 100 |
| Carbon (SRF) | 50 |
| Naphtene oil | 20 |
| Cumarone oil | 5 |
| Black factice | 5 |
| Stearic acid | 1 |
| Magnesium oxide | 4 |
| Anti-aging agent | 2 |
| Zinc oxide | 5 |

Comparative Example 3 used the same untreated canvas that was dipped for thirty seconds in RFL-H treatment liquid, as shown in Table 3, above. A wide-angle tentering treatment was formed to produce a 120° relationship between warp and weft yarns. Thereafter, the canvas was heat treated for four minutes at a temperature of 150° C. The treated canvas was thereafter dipped for thirty seconds in a soaking liquid that was made by dissolving various rubber components, shown in Table 4, above, in a toluene solution. In the solution, the concentration of rubber components was 16 wt.%. Thereafter, heat treatment was carried out at a temperature of 90° C. for four minutes.

The treated canvas was then applied to a rubber sheet having the components set out in Table 2, above, and having a thickness of 4 mm. A pressing treatment was carried out using a pressing plate with a pressure of 0.2 MPa, followed by vulcanization treatment at a temperature of 150° C. for twenty minutes. Inventive Examples 10–12 were prepared in the same manner, as set forth above, except that they were used with a rubber sheet having the components shown in Table 5, below.

TABLE 5

| Components | Parts by Weight |
|---|---|
| EPDM | 100 |
| Carbon (HAF) | 40 |
| Paraffinic oil | 15 |
| Hydrate silica | 15 |
| Sulfur | 1 |
| Stearic acid | 0.5 |
| Vulcanization accelerator (TMTD) | 1 |
| Vulcanization accelerator (DPTT) | 0.5 |
| Vulcanization accelerator (CBS) | 1 |
| Zinc oxide | 5 |

The peeling off test was carried out under JISK 6256, with the test results shown in Table 6 below; no difference was observed.

TABLE 6

| | Inventive Examples | | | | | | | Comparative Examples | |
|---|---|---|---|---|---|---|---|---|---|
| | 6 | 7 | 8 | 9 | 10 | 11 | 12 | 2 | 3 |
| Canvas configuration | Cotton 20s/2 | | | | | | | | |
| Density (per 5 cm) | Warp 70, Weft 70 | | | | | | | | |
| RFL treatment | RFL-A | RFL-B | RFL-C | RFL-D | RFL-E | RFL-F | RFL-G | RFL-H | RLF-H |
| Rubber-impregnating treatment | not done | not done | not done | not done | not done | not done | not done | friction | soaking |
| Polymer in belt body | CR | | | | | EPDM | | CR | |
| Peeling force (N/25 mm) | 200 | 210 | 205 | 210 | 210 | 210 | 200 | 170 | 175 |
| Rotation (times) | 3390 | 3400 | 3410 | 3440 | 3410 | 3420 | 3400 | 3420 | 3680 |
| Belt circumference (mm) | 1101.0 | 1100.2 | 1100.5 | 1101.0 | 1100.5 | 1100.5 | 1100.0 | 1101.1 | 1100.9 |
| Belt width (mm) | 10.69 | 10.71 | 10.71 | 10.70 | 10.71 | 10.71 | 10.72 | 10.70 | 10.71 |
| Belt thickness (mm) | 4.28 | 4.30 | 4.31 | 4.31 | 4.28 | 4.30 | 4.29 | 4.28 | 4.30 |
| Belt peel force (N/4 mm) | 48 | 49 | 49 | 50 | 52 | 53 | 50 | 43 | 46 |
| back-adhesive running test (n = 5) running time | | | | | | | | | |
| 1 min | ● | ● | ● | ● | ● | ● | ● | ▲3 | ● |
| 3 min | ● | ● | ● | ● | ● | ● | ● | X | ▲2 |
| 5 min | ● | ● | ● | ● | ● | ● | ● | X | ▲3 |
| 7 min | ▲2 | ● | ● | ● | ▲1 | ● | ▲2 | X | X |
| 9 min | X | ▲2 | ● | ● | ▲3 | ▲3 | ▲2 | X | X |
| Running durability test (hrs)# | 1500 | 1500 | 1500 | 1500 | 1500 | 1500 | 1500 | 1500 | 1500 |
| Friction coefficient | 0.45 | 0.44 | 0.44 | 0.44 | 0.45 | 0.44 | 0.43 | 0.48 | 0.44 |
| Back-transmission-running test slip rate (%/1.5N-m) | 2.9 | 2.8 | 2.8 | 2.8 | 2.8 | 2.8 | 2.9 | 2.5 | 2.8 |

●: No rubber dregs appeared and no change was observed in the appearance of the belts before and after running.
▲: Rubber dregs appeared in some belts, but not in others, with the number of the belts on which rubber dregs appeared noted.
X: Rubber dregs appeared in all of the tested belts
Each test was ceased at the time The treated canvas was pressed using a pressing plate with a pressure of 0.2 MPa, followed by vulcanization treatment at a temperature of 150° C. for twenty minutes to obtain a test piece for a Taber abrasion test. The test was carried out under JISL 1096 with an H-18 abrasion wheel. The number of rotations was measured at the moment that the test piece was pierced. The test results are shown in Table 6, above with no difference found in this respect for Inventive Examples 6–12 and Comparative Examples 2 and 3.

Next, V-ribbed belts were manufactured. A load carrying cord was formed by twisting 1,000 denier of poly (ethyleneterephthalate) (PET) fiber with reverse primary and final twist directions. The primary and final twist factors were 3.0 to make a 2×3 twist configuration with a total denier of 6,000.

For Inventive Examples 6–9 and Comparative Examples 2 and 3, the compression rubber layers and cushion rubber layers were prepared using the components shown in Table 2, above. They were mixed and kneaded in a Banbury mixer and then rolled using calender rolling equipment. The compression rubber layer had short cut fibers therein, of which 10 parts by weight were aramid fibers and 10 parts by weight were nylon fibers mixed and arranged so that their lengths extended in a lateral direction.

Inventive Examples 10–12 were prepared in the same manner, except that they used a rubber sheet containing the components shown in Table 5, above.

The V-ribbed belts were made in conventional fashion. One ply of the canvas was applied to a mold followed by the winding of a cushion rubber layer component therearound. Load carrying cords were wound around the cushion rubber layer component after which a compression cushion rubber layer component was applied. A vulcanizing jacket was then placed around the compression rubber layer. The resulting sleeve structure and jacket was then introduced into a vulcanizer and cross-linked. The resulting cross-linked sleeve was then separated from the mold. The compression rubber layer was processed to form ribs, and ultimately the sleeve was cut to form individual belts. The resulting V-ribbed belts were a K-type 3PK 1100, with a length of 1100 mm under the RMA standard.

The resulting belts were evaluated in terms of both static and dynamic properties. Static properties were tested by a canvas peeling-off test using JISK 6253. The results are shown in Table 6, above, with there being no substantial difference between the results for Inventive Examples 6–12 and Comparative Examples 2 and 3.

Dynamic properties were evaluated by using back-adhesive-running testing, back-transmission-running testing, friction-coefficient-measuring testing, and running-durability testing.

In the back-adhesive-running test, the backs of the V-ribbed belts were trained around a flat driving pulley and a flat driven pulley, each having a diameter of 70 mm. The driving pulley was rotated at 3500 rpm, with a load on the driven pulley of 5.6 PS. The belt was run on its back surface, with the appearance of the back of the belt observed at time intervals of 1 minute, 3 minutes, 5 minutes, 7 minutes, and 9 minutes after startup, to investigate whether or not rubber dregs appeared. Five belts were tested.

In the back-transmission-running test, the backs of the V-ribbed belts were trained around a flat driving pulley having a diameter of 80 mm and a flat driven pulley having a diameter of 110 mm. The belt was run on its back surface and its slip ratio (%) with a torque of 1.5 (N-m) was measured.

In the friction-coefficient-measuring test, one end of the V-ribbed belts, trained around a pulley with a diameter of 60 mm, was fixed. The other end was forced to bear a load of 17.2 N. The pulley was then rotated at a speed of 43 rpm as the tensile strength of the belt was measured, to thereby calculate a friction coefficient in accordance with the following equation:

$$\text{Friction coefficient} = 2 \times \ln(T/1\ 7.2)/\pi.$$

(T=tensile strength of the belt)

In the running-durability test, the belts were trained around driving and driven pulleys, each having a 120 mm diameter, an idler pulley having an 85 mm diameter, and a tensioning pulley having a 45 mm diameter. The winding angle between the idler pulley and the back of the belt was 120°. The angle between the tensioning pulley and the belt was 90°. The surrounding atmosphere was maintained at 85° C. The driving pulley was rotated at 4900 rpm with a load of 8.8 kW on the driven pulley. After an initial tensile force of 559 N per 3 ribs was applied on the tensioning pulley, the time at which some cracks were generated on the ribs was measured.

After intervals of 1, 3, and 5 minutes, no change was found in the appearance of Inventive Examples 6–12. However, rubber dregs appeared on the back of Comparative Examples 2 and 3, creating an environment for unwanted adhesion.

After intervals of 7 and 9 minutes, no change was found in the appearance of Inventive Examples 8 and 9. Rubber dregs appeared on Inventive Examples 6, 7 and 10–12.

Additionally, in the slip ratio in the back-transmission-running testing, friction coefficient testing, and the running-durability testing, no substantial difference was found between Inventive Examples 6–12 and Comparative Examples 2 and 3.

The foregoing disclosure of specific embodiments is intended to be illustrative of the broad concepts comprehended by the invention.

What is claimed is:

1. A power transmission belt comprising:
    a body having a length, an inside, an outside, and laterally oppositely facing side surfaces,
    the body comprising a) a cushion rubber layer in which at least one load carrying element is embedded so that the at least one load carrying element extends lengthwise relative to the body, and b) a compression rubber layer; and
    a fabric material on one of the inside and outside of the body,
    the fabric material treated with a mixture of carbon-black-dispersed liquid and resorcinol-formalin-latex liquid wherein the mixture contains no epoxy resin.

2. The power transmission belt according to claim 1 wherein a solid component weight ratio of carbon black to the resorcinol-formalin-latex in the mixture is 1:9 to 7:3.

3. The power transmission belt according to claim 2 wherein the mixture further comprises a cross-linking agent capable of being dispersed in water.

4. The power transmission belt according to claim 3 wherein the cross-linking agent comprises colloidal sulfur.

5. The power transmission belt according to claim 4 wherein the cross-linking agent further comprises metal oxide and a latex component in the resorcinol-formalin-latex liquid has functional groups.

6. The power transmission belt according to claim 4 wherein the cross-linking agent further comprises zinc oxide and a latex component in the resorcinol-formalin-latex liquid is vinylpyridine latex.

7. The power transmission belt according to claim 1 wherein the mixture further comprises a cross-linking agent capable of being dispersed in water.

8. The power transmission belt according to claim 7 wherein the cross-linking agent comprises colloidal sulfur.

9. The power transmission belt according to claim 8 wherein the cross-linking agent further comprises metal oxide and a latex component in the resorcinol-formalin-latex liquid has functional groups.

10. The power transmission belt according to claim 8 wherein the cross-linking agent further comprises zinc oxide and a latex component in the resorcinol-formalin-latex liquid is vinylpyridine latex.

11. The power transmission belt according to claim 8 wherein the colloidal sulfur is present in the mixture in a range of 0.2–10 parts by mass per 100 parts of a latex component.

12. The power transmission belt according to claim 8 wherein the organic peroxide is present in the mixture in the range of 0.2–15 parts by mass per 100 parts of a latex component.

13. The power transmission belt according to claim 7 wherein the mixture further comprises a vulcanization accelerator.

14. The power transmission belt according to claim 13 wherein the vulcanization accelerator is present in an amount of 0.5–15 parts by mass per 100 parts by mass of rubber latex.

15. The power transmission belt according to claim 1 wherein the compression rubber layer has at least one rib extending lengthwise of the belt body.

16. The power transmission belt according to claim 15 wherein the at least one rib is on the inside of the body and the fabric material is on at least the outside of the body.

17. The power transmission belt according to claim 1 wherein the fabric material comprises at least one of a) natural fiber, b) inorganic fiber, and c) organic fiber formed by one of i) plain weaving, ii) twill weaving, and iii) sateen weaving.

18. The power transmission belt according to claim 1 wherein carbon black in the carbon-black-dispersed liquid comprises at least one of HAF, MAF, EPC, and ISAF.

19. The power transmission belt according to claim 1 wherein the body further comprises short fibers which have lengths extending generally in a lateral direction.

20. The power transmission belt according to claim 1 wherein the power transmission belt is a V-belt and the fabric material is on the inside of the body.

21. The power transmission belt according to claim 1 wherein the power transmission belt is a V-belt and the fabric material is on the outside of the body.

22. The power transmission belt according to claim 1 wherein the power transmission belt is a flat belt.

23. The power transmission belt according to claim 1 wherein all solid components in the mixture are present in a range of 5–40%.

24. The power transmission belt according to claim 1 wherein the mixture further comprises a cross-linking agent comprising a metal oxide.

25. The power transmission belt according to claim 24 wherein the metal oxide is present in the mixture in a range of 0.5–15 parts by mass per 100 parts of a latex component.

26. The power transmission belt according to claim 1 wherein the compression rubber layer comprises at least one of a) hydrogenated nitrile rubber, b) cheoroprene rubber, c) natural rubber, d) CSM, e) ACSM, f) SBR, and g) ethylene-α-olefin elastomer.

27. The power transmission belt according to claim 1 wherein the at least one load carrying element is a load carrying cord that comprises at least one of a) polyester fiber, b) aramid fiber, and c) glass fiber.

28. The power transmission belt according to claim 1 wherein the organic peroxide is present in the mixture in the range of 0.2–15 parts by mass per 100 parts of a latex component.

29. The power transmission belt comprising:
a body having a length, an inside, an outside, and laterally oppositely facing side surfaces,
the body comprising a) a cushion rubber layer in which at least one load carrying element is embedded so that the at least one load carrying element extends lengthwise relative to the body, and b) a compression rubber layer; and
a fabric material on one of the inside and outside of the body,
the fabric material treated with a mixture of carbon-black-dispersed liquid and resorcinol-formalin-latex liquid and an organic peroxide cross-linking agent capable of being dispersed in water.

30. The power transmission belt comprising:
a body having a length, an inside, an outside, and laterally oppositely facing side surfaces,
the body comprising a) a cushion rubber layer in which at least one load carrying element is embedded so that the at least one load carrying element extends lengthwise relative to the body, and b) a compression rubber layer; and
a fabric material on one of the inside and outside of the body,
the fabric material treated with a mixture of carbon-black-dispersed liquid and resorcinol-formalin-latex liquid, and an organic peroxide cross-linking agent capable of being dispersed in water,
wherein a solid component weight ratio of carbon black to the resorcinol-formalin-latex in the mixture is 1:9 to 7:3.

31. A power transmission belt comprising:
a body having a length, an inside, an outside, and laterally oppositely facing side surfaces; and
a fabric material on one of the inside and outside of the body,
the fabric material treated with a mixture of carbon-black-dispersed liquid and resorcinol-formalin-latex liquid wherein the mixture contains no epoxy resin.

32. The power transmission belt according to claim 31 wherein the body further comprises at least one load carrying element extending lengthwise relative to the body.

33. The power transmission belt according to claim 32 wherein the at least one load carrying element comprises a load carrying cord.

34. The power transmission belt according to claim 31 wherein the power transmission belt is a V-ribbed belt.

35. The power transmission belt according to claim 31 wherein the power transmission belt is a V-belt.

36. The power transmission belt according to claim 31 wherein the power transmission belt is a flat belt.

37. A power transmission belt comprising:
a body having a length, an inside, an outside, and laterally oppositely facing side surfaces, the body comprising a) a cushion rubber layer in which at least one load carrying element is embedded so that the at least one load carrying element extends lengthwise relative to the body, and b) a compression rubber layer; and a fabric material on one of the inside and outside of the body, the fabric material treated with a mixture of carbon-black-dispersed liquid and resorcinol-formalin-latex liquid.

38. A power transmission belt comprising:

a body having a length, an inside, an outside, and laterally oppositely facing side surfaces; and a fabric material on one of the inside and outside of the body, the fabric material treated with a mixture of carbon-black-dispersed liquid and resorcinol-formalin-latex liquid.

* * * * *